March 6, 1973  M. W. TRACY  3,719,216
AUTOMATIC STAKE SHARPENING APPARATUS
Filed Sept. 22, 1971  5 Sheets-Sheet 2
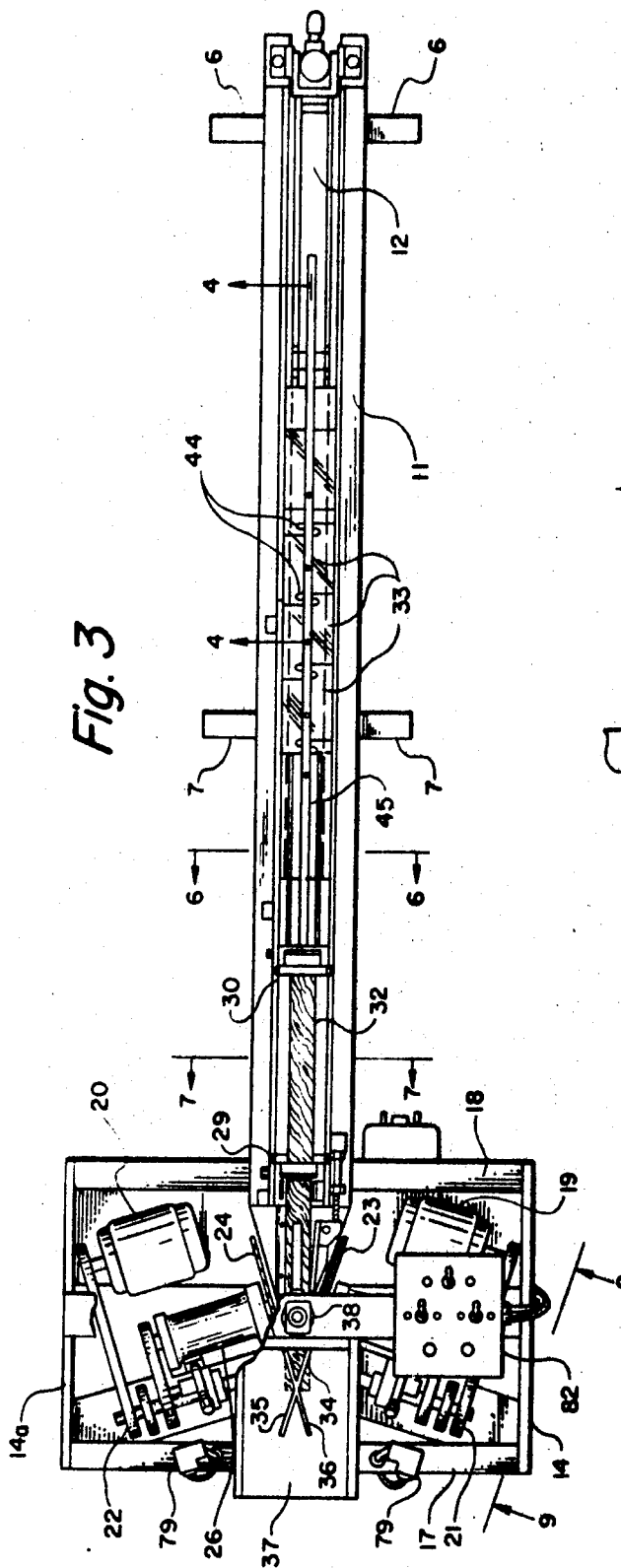
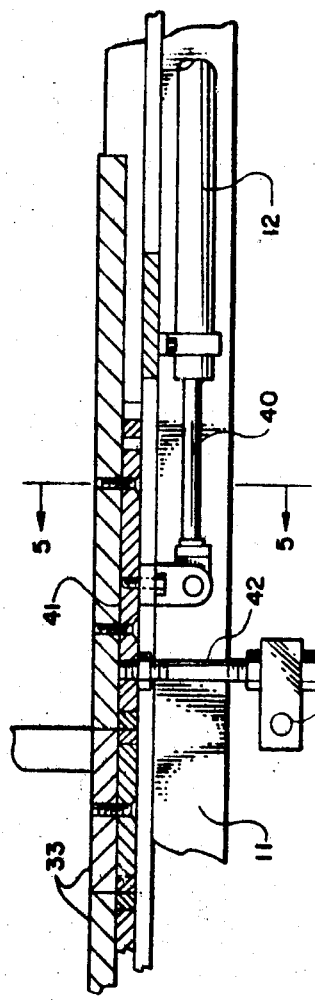
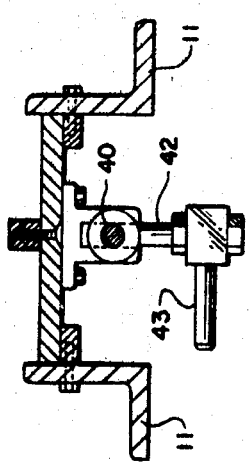

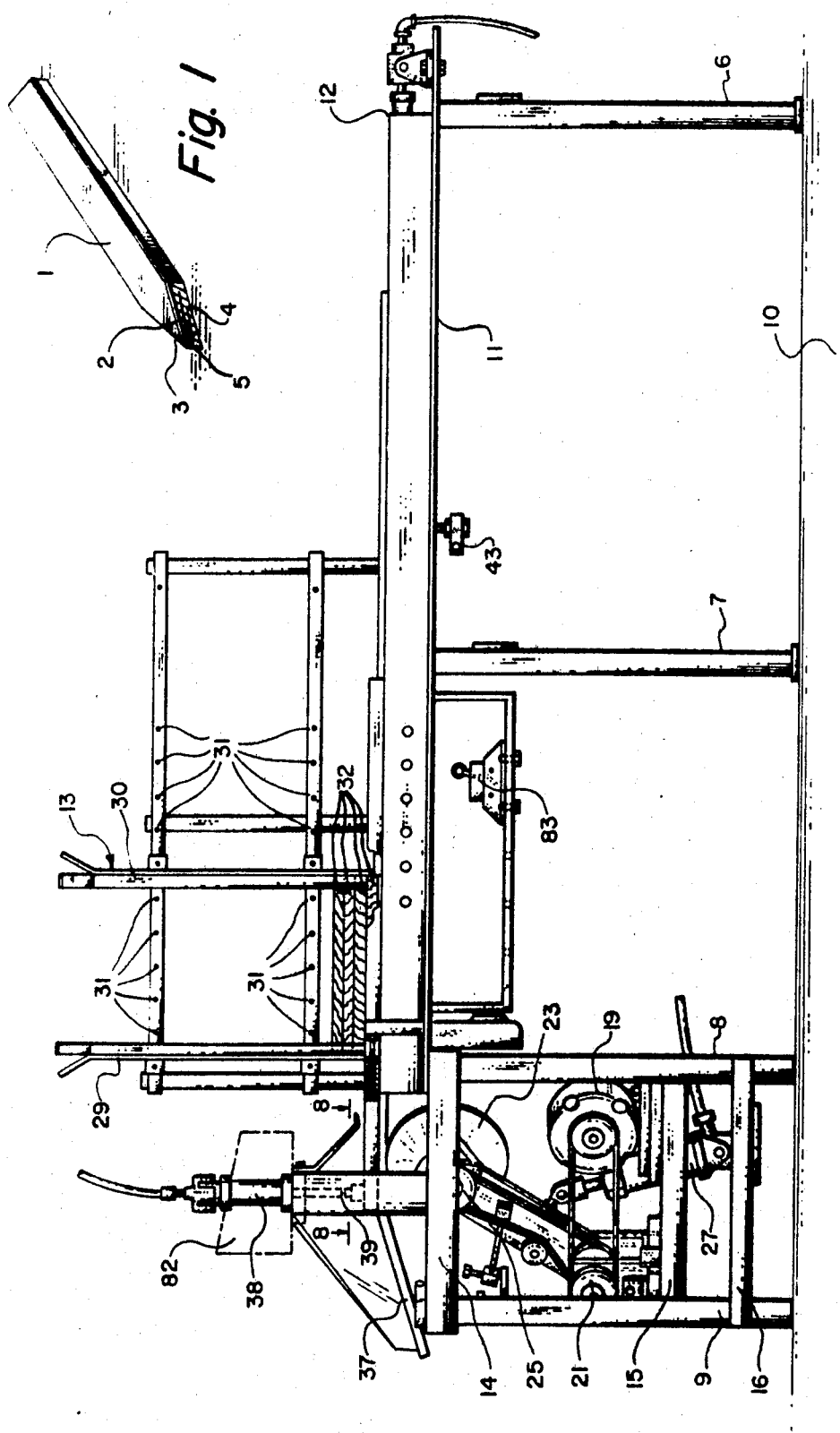

United States Patent Office 3,719,216
Patented Mar. 6, 1973

3,719,216
AUTOMATIC STAKE SHARPENING APPARATUS
Manville W. Tracy, 5750 N. 10th St.,
Phoenix, Ariz. 85004
Filed Sept. 22, 1971, Ser. No. 182,594
Int. Cl. B27b 5/02; B27m 3/00
U.S. Cl. 83—471.2      5 Claims

ABSTRACT OF THE DISCLOSURE

Apparatus is provided for serially advancing stake blanks from an adjustable hopper utilizing a hydraulic ram. As each stake is advanced to a sharpening position, a hydraulic clamp holds the stake while it receives first and second angular cuts in sequence to effect the sharpening. After the sequential cuts are completed, the hydraulic clamp withdraws to permit the sharpened stake to be ejected as the hydraulic ram pushes the next blank into position. The angular cuts are achieved by hydraulically advancing motor driven circular saws one at a time to avoid interference with one another. The sequence of operation is controlled by a logical combination of switches actuated by the various moving parts which function to selectively energize and de-energize solenoids controlling fluid flow and retention to the several hydraulic elements.

My invention relates to the wood working arts and, more particularly, to apparatus for automatically sharpening wooden stakes such as those utilized by surveyors and others in marking and temporarily recording land boundary determinations.

Wooden stakes utilized by surveyors and others for marking specific locations and boundaries are usually simply left in position because it is uneconomical to retrieve them. As a result, an enormous number of such stakes are consumed. The stakes have been prepared by hand, or at best, semiautomatically in the past. For example, the most usual prior art method is to arrange the guides of an ordinary table saw at an appropriate angle such that precut blanks may be sharpened by an operator using two passes with an intermediate flip of the blank between the passes. In effect, only the sawing and guiding can even be considered semiautomatic. For each stake sharpened, the blank must be picked up, sawed on the first pass, turned over, sawed on the second pass, and removed to a pile of completed stakes which may be subsequently manually bundled for sale. There are two distinct objections to this prior art method of preparing stakes; viz: first, the job is extraordinarily tedious such that the operator tends to slacken his pace and fails to achieve even the quantities expected of an efficient operator, and second, even with the most diligent operator, the quantities of stakes which can be turned out is severely limited. Other drawbacks to the prior art are that the two cuts are often not uniform and, further, a certain amount of danger to the operator is inherent in the method. Thus, it will be apparent that it would be highly desirable to provide stake sharpening apparatus which is virtually automatic, produces a uniform product at great speed, and paces the operator in order that he achieves an appropriate output without becoming bored or so careless that he might be injured through inattention.

It is therefore a principal object of my invention to provide automatic stake sharpening apparatus for preparing surveyor's stakes from precut blanks.

It is another object of my invention to provide such apparatus which produces a uniform product in great quantities.

It is yet another object of my invention to provide such apparatus which receives blanks in a hopper and automatically advances one blank at a time into a stake sharpening position in which it is constrained.

It is a still further object of my invention to provide means in the apparatus responsive to the placement of a stake in the sharpening position to serially advance first and second saw means at predetermined angles to effect the sharpening.

Yet another object of my invention is to provide such apparatus in which the various mechanical movements are carried out hydraulically under the logical control of interconnected switches sensitive to the positions of the various moving parts and electrically operated solenoids which control fluid flow to the hydraulic cylinders which bring about the movements.

The subject matter of the invention is particularly pointed out and distinctly claimed in the concluding portion of the specification. The invention, however, both as to organization and method of operation, may best be understood by reference to the following description taken in connection with the accompanying drawing of which:

FIG. 1 is a perspective view of a typical surveyor's stake;

FIG. 2 is a side view of the apparatus constituting the present invention;

FIG. 3 is a top view of the apparatus illustrating more clearly the angular disposition of certain of the operating components;

FIG. 4 is a partial cross-sectional view taken along the line 4—4 of FIG. 3;

FIG. 5 is a transverse cross-sectional view taken along the line 5—5 of FIG. 4;

Figure 6:
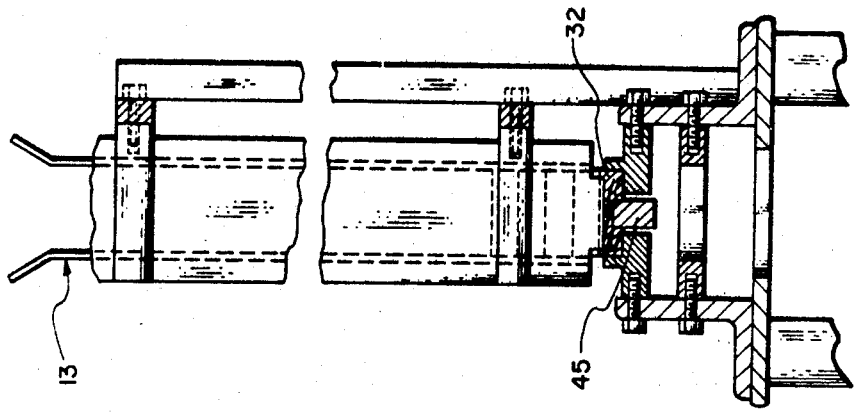
FIG. 6 is a transverse cross-sectional view taken along the line 6—6 of FIG. 3 to provide a rear view of the adjustable hopper.

FIG. 1 illustrates a typical surveyor's stake 1 which may vary considerably in length from application to application. One end 2 of the stake is pointed by making angular cuts to achieve the surfaces 3 and 4 ending in the point 5. For certain applications, it is also desirable to cut the surfaces disposed at 90° from the surfaces 3 and 4 to achieve a pyramidal point. The latter cut is made from square blanks whereas the more common configuration shown in FIG. 1 is made from blanks of rectangular cross-section previously cut to length. As the description proceeds, it will become apparent that the apparatus according to the present invention can accommodate either square or rectangular blanks and provide the appropriate point for either.

Apparatus is provided according to the present invention for automatically cutting the points onto either square or rectangular surveyor's stake blanks. Thus, referring to FIG. 2, the general configuration of a presently preferred embodiment of the invention is shown in side view. Similarly, the apparatus of FIG. 2 is presented in a top view in FIG. 3, and the following general description may best be understood by coordinated reference to FIGS. 2 and 3.

The apparatus of the present invention is preferably sturdily supported on steel vertical leg members 6, 7, 8, and 9 which may be anchored to a cement foundation 10 to achieve maximum stability. However, it has been found that the exemplary configuration is sufficiently stable to function without being anchored. The legs 6 and 7 and leg pairs 8 and 9 support a framework including a channeled beam 11 which carries a horizontal hydraulic ram 12 and hopper means generally indicated at 13. The forward end of the framework also includes cross members 14 and 14a and additional cross members 15 and 16 with corresponding cross members, not shown, between the vertical leg members 8 and 9. The framework further includes transverse members 17 and 18 and corresponding transverse members, not shown in FIGS. 2 and 3, between the legs 8 and between the legs 9. The cross member 15 extends generally across the whole area bounded by the legs 8 and 9 and corresponding legs, not shown, to provide a planar support for induction motors 19 and 20 as well as belt driven power transfer apparatus 21 and 22 to be described in further detail presently. The power transfer apparatus 21 and 22 communicates rotation from the induction motors 19 and 20 to circular saw means 23 and 24 carried by journals 25 and 26, respectively, which comprise a portion of the power transfer apparatus. Saw advancing hydraulic rams 27 and 28 pivot the power transfer apparatus 21 and 22, respectively, in a logically timed manner to serially cut the two surfaces 3 and 4, FIG. 1, of a stake being operated upon in a manner to become more apparent as the description of the apparatus proceeds. The lower portion of the saw advancing hydraulic rams 27 and 28 are angled to the cross member 16 which, like the cross member 15, provides a planar area between the vertical legs 8 and 9 and corresponding legs not shown in the views.

The hopper means 13 includes a forward hopper member 29 and a rear hopper member 30 which may be affixed to the apparatus in spaced apart relationship by fixing each to an appropriate one of the several guide apertures 31 according to the blank length utilized in preparing a given run of stakes.

Still referring to FIGS. 2 and 3, the hopper 13 holds a plurality of stake blanks 32 previously cut to standard lengths. In the sequence of operation to be described below, the hydraulic ram 12, acting through one or more links 33, advances to push the lowermost blank forwardly into a cutting position generally indicated by the position of the blank 34. When the blank 34 is pushed into the cutting position, the hydraulic ram 12 withdraws to permit the next blank 32 to drop into the lowermost hopper position in preparation for assuming the cutting position after the blank 34 has been pointed.

In the sequence of operation, the blades 23 and 24 are serially advanced and withdrawn to point the blank 34, each passing upwardly into guide slots 35 and 36 respectively under control of the hydraulic rams 27 and 28 which, in turn, are controlled by solenoids which determine the flow of compressed air (or other hydraulic fluid) to and also the release of air from the pistons within the hydraulic rams 27 and 28, all of which will be explained in detail below.

When the circular saws 23 and 24 have advanced and cut the surfaces 3 and 4, FIG. 1, to complete the pointing of the stake blank 34, the hydraulic ram 12 again advances to push the pointed blank 34 onto the front trough 37 of the apparatus from which it falls onto a pile of completed stakes.

During the cutting operation, it has been found necessary to constrain the blank 34 being operated upon against movement in any direction. To achieve this, a stake holding hydraulic ram 38 extends a pressure arm 39 downwardly to bear upon the upper surface of the blank 34 which, in conjunction with the guide means to be described, holds the blank 34 in the precise position designed to effect a clean, symmetrical pointing operation. When the circular saws 23 and 24 are sequentially advanced to effect their respective cuts, the stake holding hydraulic ram 38 is released to retract the pressure arm 39 thereby permitting ejection of the completed stake 34 and the positioning of the lowermost stake in the hopper 13 into the cutting position under the control of the horizontal hydraulic ram 12.

Figure 7:
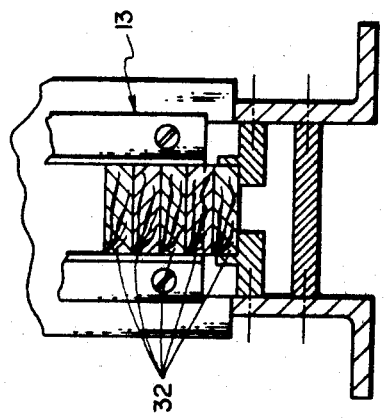
FIG. 7 is a partial cross-sectional view taken through the bottom portion of the hopper.

As previously stated, the forward hopper member 29 and the rear hopper member 30 can be affixed in predetermined positions by wing nuts or the like to accommodate various standard lengths of stake blanks 32. A commensurate adjustment of the pushing termination of the horizontal hydraulic ram 12 may be accomplished by removing or adding one or more interlocking links 33 in order that the last link terminates adjacent the lowermost stake blank 32 in the hopper 13 and delivers a longitudinal stroke to properly position the blank in the cutting position upon actuation of the horizontal hydraulic ram 12. The manner in which the longitudinal movement of the hydraulic ram 12 is communicated to the several interlocking links 13 is perhaps best shown in FIGS. 4 and 5 in which it will be observed that the arm 40 of the ram 12 extends to propel a first link 41 to which it is permanently affixed and which also carries a downwardly extending arm 42 from which a switch actuator 43 extends transversely. One or more interlocking links 33 may be coupled together in accordance with the S configuration 44, FIG. 3, of their ends to adjust the position at which the stroke of the horizontal hydraulic ram 12 is delivered to the lowermost stake blank 32 in the hopper 13 as previously described. Referring simultaneously to FIGS. 3, 6, and 7, it will be observed that the last interlocking link 33 bears upon a pusher element 45 which engages the rear edge of the lowermost stake blank 32 in the hopper 13 and thus serves to advance the lowermost stake blank into the sharpening position and allowing the next stake blank 32 to drop into the lowermost position upon retraction of the coupled together links 33 and pusher element 45 under control of the horizontal hydraulic ram 12 acting through its translating arm 40.

Figure 8:
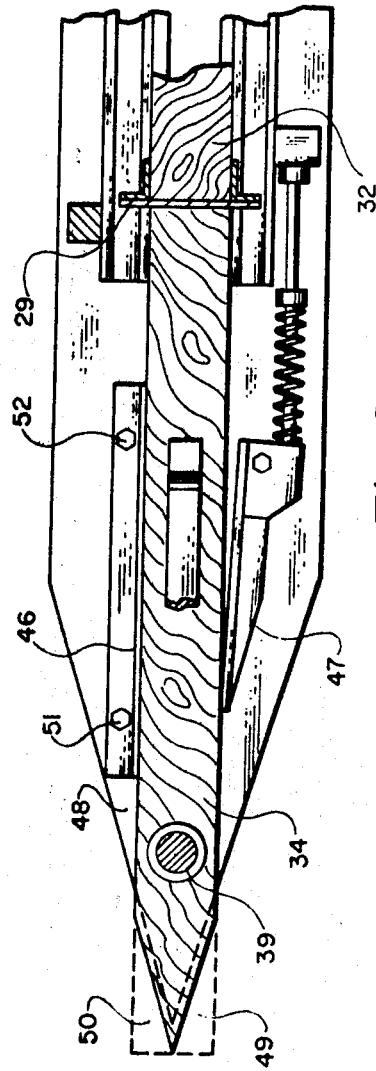
FIG. 8 is a detail view of a portion of the apparatus taken along the line 8—8 of FIG. 2 and illustrating a just-completed blank guided to and constrained in the sharpening position.

Reference is now taken to FIG. 8 which illustrates the stake blank 34 held in the cutting position by a stationary, adjustable guide 46 and a spring loaded guide 47 in conjunction with the downward pressure of the arm 39 of the stake holding hydraulic ram 38 which bears upon the upper surface of the blank 34. It will be observed that the blank 34 has been pushed into position by the action of the pusher element 45 which has advanced the blank 34 through an opening beneath the forward hopper member 29 which is sufficient to pass only the lowermost blank. With the blank 34 in the cutting position illustrated in FIG. 8, the circular saws 23 and 24, FIG. 3, may advance sequentially to cut away the portions 49 and 50 leaving the blank 34 pointed as desired after which, as previously indicated, the downward pressure exerted by the pressure arm 39 of the stroke holding hydraulic ram 38 is released to permit ejection of the pointed stake and positioning of the lowermost blank 32 from the hopper into the cutting position for a succeeding pointing operation. The stationary, adjustable guide member 46 may be moved outwardly or inwardly by loosening nut and bolt assemblies 51 and 52 and moving them to different aperture pairs (not shown in FIG. 8) to accommodate blanks of different widths.

Figure 9:
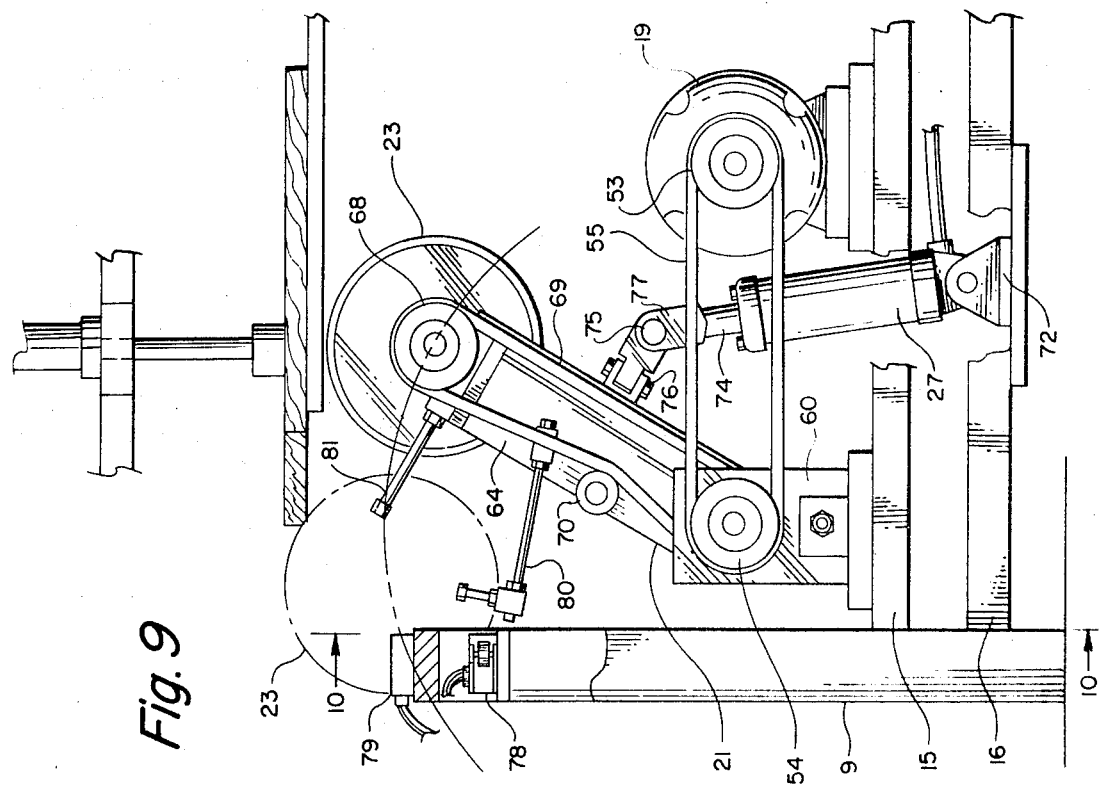
FIG. 9 is an angular detail view taken along the line 9—9 of FIG. 3 to illustrate in detail the mechanical movement of one of the two saw elements which effect the sharpening cut.
Figure 10:
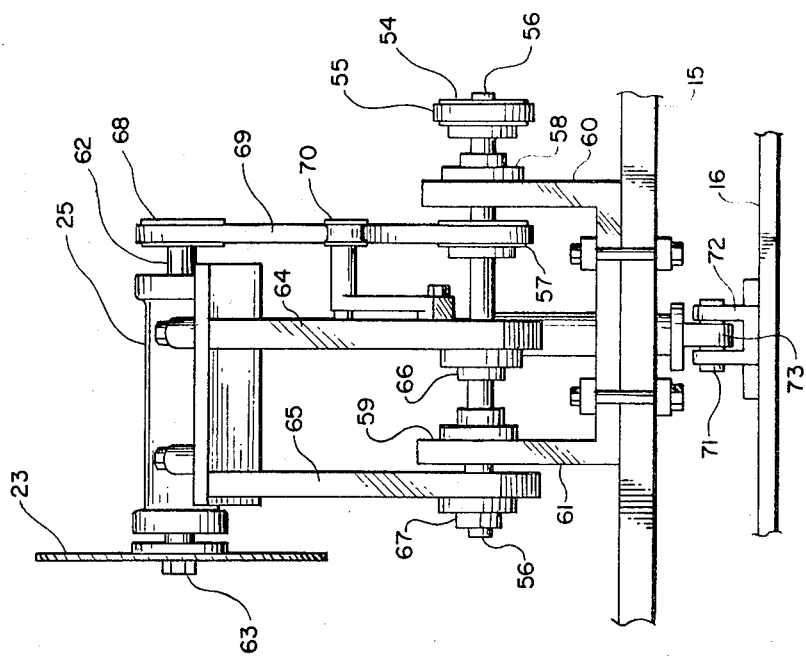
FIG. 10 is a view from the line 10—10 of FIG. 9 providing further illustration of the saw mechanism.

FIGS. 9 and 10 illustrate in detail the mechanism associated with the circular saw member 23. It will be understood that the circular saw member 24 and its associated mechanism is a mirror image, and that it is therefore necessary to describe only one of the alternately acting saw mechanisms. As previously noted, the saw 23 is rotated by an induction motor 19 through a power transfer apparatus 21. A pulley 53 carried by the shaft of the motor 19 is coupled to a second pulley 54 by a belt 55. The pulley 54 is fixed to a shaft 56 to which another pulley 57 is fixed in a somewhat inboard position. The shaft 56, as best shown in FIG. 10, is provided with heavy duty bearings 58 and 59 which are mounted on sturdy uprights 60 and 61, respectively.

The journal 25, which supports the shaft 62, to which the saw 23 is secured by means of a nut 63 or other conventional means, is supported by arms 64 and 65 pivotally supported on the shaft 56 by bearings 66 and 67. The opposite end of the shaft 62 from the saw 23 has a pulley 68 fixed thereto for receiving power transfer from the pulley 57 through the belt 69. Tension on the belt 69 is adjusted in the obvious manner utilizing the idler wheel 70 which is tightened to the arm 64.

The lower end of the saw advancing hydraulic ram 27 is pivotally fixed to the cross member 16 by a pin 71 passing through aligned apertures of an upright 72 and the lower portion 73 of the hydraulic ram 27. Similarly, the extendible arm 74 is pivotally secured to the back of the arm 64 by a pin 75 or the like passing through aligned apertures in a rearwardly extending support 76 and in the outer end portion 77 of the arm 74. Thus, it will be apparent that when the arm 74 is hydraulically extended, the power transfer apparatus 21 will advance the rotating circular saw 23 to a position indicated at 23' in FIG. 9.

As previously noted, the flow of hydraulic fluid to the various hydraulic cylinders is controlled in a logical sequence by switches which activate solenoid actuated valves in communication with the cylinders, and with a source of hydraulic fluid under pressure. As shown in FIGS. 2 and 9, the switches 78 and 79 are actuated when switch actuators 80 and 81, respectievly, pass over the rollers thereof during pivotal movement of the power transfer apparatus 21 which causes the circular saw 23 to advance, make its cut, and retract. Corresponding switches for the apparatus associated with the other circular saw 24 are numbered 78' and 79' for convenience in discussing the electrical wiring diagram of FIG. 12. Additional switches, both toggle and push button, are contained on the control panel 82, and additionally, switch actuator 43, which is carried by the horizontal hydraulic ram 25, passes over the roller of yet another switch 83, best shown in FIG. 2.

Figure 12:
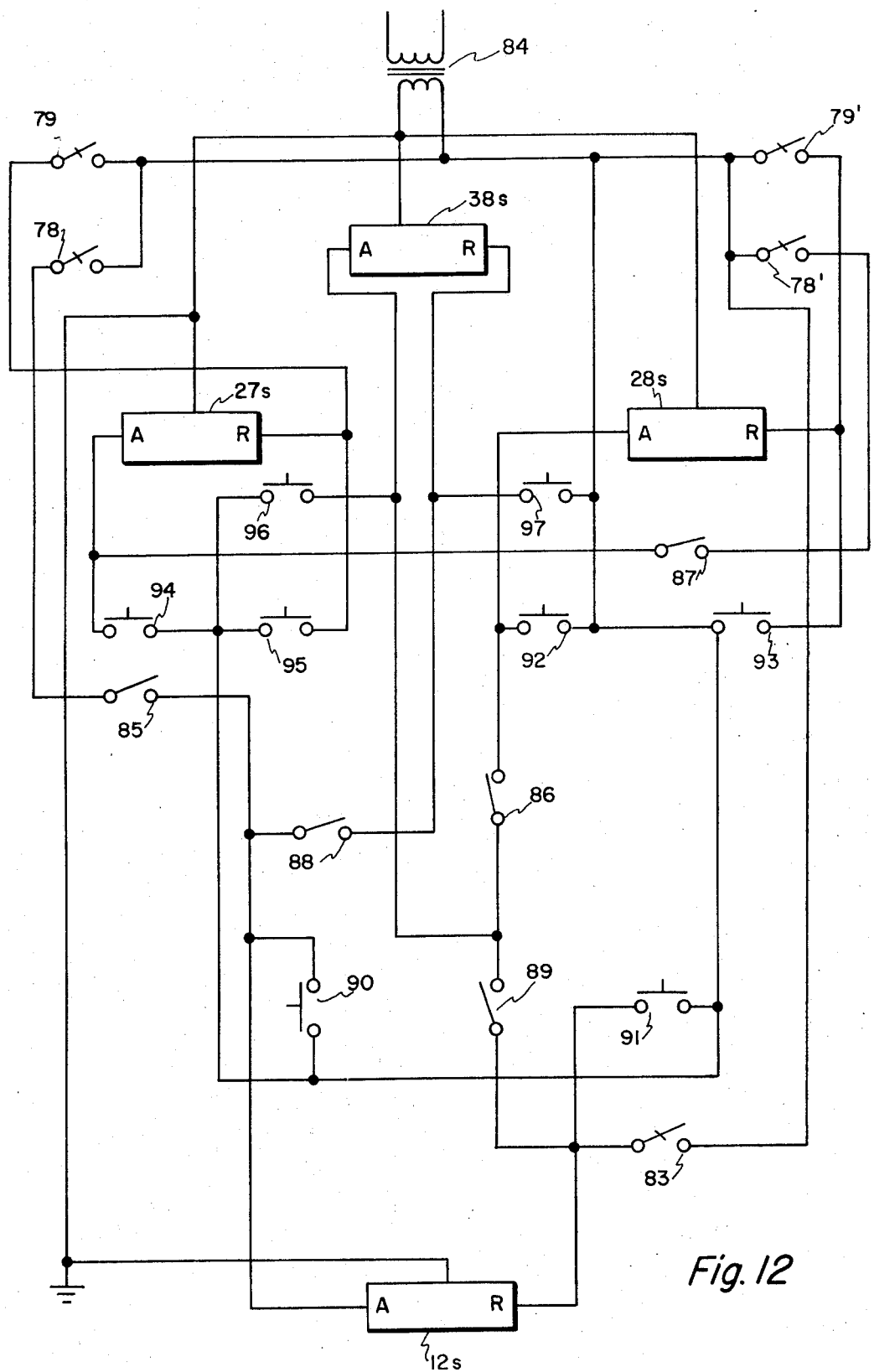
FIG. 12 is a schematic diagram illustrating the interconnection of the various solenoids, operator controlled switches, and mechanism controlled switches which coordinate the operation of the machine in a logical manner.

FIG. 12 is a schematic wiring diagram illustrating the interconnection of the various manually actuated switches, machine actuated switches, and solenoid controlled valves which are associated with each hydraulic cylinder and determine the position thereof. In FIG. 12, the solenoid operated valves 12S, 27S, 28S, and 38S control, respectively, the corresponding hydraulic cylinders 12, 27, 28 and 38. The operation of these solenoid operated valves is well known to those skilled in the art. Briefly, when the "A" terminal is energized momentarily, the solenoid operated valve assumes a position admitting pressurized fluid, preferably compressed air, into the corresponding cylinder to expand the chamber within the cylinder thereby causing the arm to extend to its limit. The solenoid operated valve remains in this position until the "R" terminal is momentarily energized to shift the valve position such that the pressure within the cylinder is relieved allowing the arm to retract. For the instant application, the compressed air may simply be vented to atmospheric provided the hydraulic cylinders selected are biased to the retracted position. Alternatively, of course, a valve/cylinder arrangement can be utilized in which the hydraulic fluid provides positive displacement to the retracted position as well as to the extended position.

Figure 11:
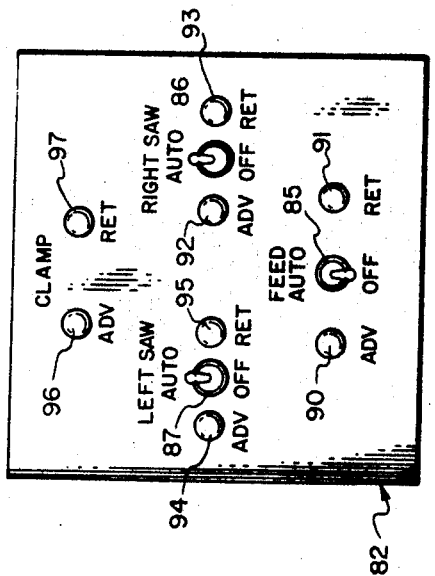
FIG. 11 is a plan view of an operator's control panel.

In the exemplary embodiment disclosed, the solenoid operated valves 12S, 27S, 28S, and 38S operate on 12 volts A-C for safety purposes, and therefore a step down transformer 84 is utilized to provide this energization voltage from a power line. As shown in FIG. 12, toggle switches 85, 86, and 87 are provided on the control panel, FIG. 11, to lock out, respectively, energization of the advance function of the blank feed cylinder 12, the right saw cylinder 28, and the left saw cylinder 27. Additional toggle switches 88 and 89, not located on the control panel 82, lock out, respectively, the retract function of the clamp cylinder 38 and the advance function of the clamp cylinder 38 and the right saw cylinder 28. To provide the operator with the ability to test the mechanism and to "single step" through the automatic sequence, momentary contact pushbutton switches are provided for applying 12 volts A-C to each of the advance and retract terminals of each of the solenoid operated valves. As shown in FIG. 12, pushbutton switches 90 and 81 permit manual advance and retraction of the blank feed cylinder 12; pushbutton switches 92 and 93 permit, respectively, advance and retraction of the right saw cylinder 28; pushbutton switches 94 and 95 permit advance and retraction, respectively, of the left saw cylinder 27; and pushbutton switches 96 and 97 permit respectively, advance and retraction of the clamp cylinder 28.

In operation, the toggle switches 88 and 89 are normally closed. The operator, after loading the hopper 13 with an initial charge of blanks, brings the apparatus to a normal starting position in which all cylinders are retracted. The toggle switches 85, 86, and 87 are then moved to the automatic position to permit institution of the automatic sequence. Automatic operation is instituted by actuating the blank feed pushbutton 90 to energize the advance terminal of the blank feed cylinder 12 which therefore extends its arms 40 pushing the lowermost blank 32 into the cutting position. When the arm 40 is extended, the actuator 43 passes over the roller of the switch 83 which is therefore normally closed to apply 12 volts A-C to the advance terminals of the clamp solenoid operated vlave 38S and the right saw solenoid operated valve 28S. As a result, the pressure arm 39 of the stake holding clamp cylinder 38 is extended downwardly to bear upon the stake blank being operated upon and, simultaneously, the right saw is pushed upwardly by the right saw cylinder 28 to effect the right side cut. During its pivotal motion to the uppermost position, the mechanism associated with the saw 24 actuates the switch 78' by means of a forwardly extended switch actuator corresponding to the actuator 80 in FIG. 9. However, both the switches 78 and 78' are of the alternate actuation type connected in such a manner that they must be actuated twice before the contacts coupled into the circuit momentarily close. Thus, while the switch 78' is actuated during the forward swing of the right saw 23, the contacts thereof do not close at that time.

When the right saw 24 has completed its cut, an actuator, corresponding to the actuator 81 shown in FIG. 9 momentarily closes the switch 79' to energize the retract function of the solenoid operated valve 28S thereby instituting retraction of the right saw. During its rearward travel, the switch 78' is actuated once again and, since this is the second actuation thereof, the contacts close momentarily to energize the advance function of the left saw solenoid operated valve 27S. As a result, compressed air is admitted to the cylinder 27 which pivots upwardly to effect the left side cut, actuating the switch 78 for the first time during its upward pass. When the left side cut has been made, the actuator 81 normally actuates the switch 79 to energize the retract terminal of the solenoid operated valve 27S thereby causing the left saw 23 to retract. During retraction, the actuator 80 once again actuates the switch 78 to close the contacts thereof. As a result, the retract terminal of the clamp solenoid operated valve 38S is energized to release the pointed stake. Simultaneously, the advance terminal of the blank feed solenoid operated valve 12S is energized and responds by pushing the next blank into position, ejecting the completed stake and instituting another cycle of operation. While normal operation continues, it is only necessary that the operator keep blanks in the hopper and gather the complete stakes for disposal in the manner desired.

If blanks of square cross-section are utilized in contemplation of effecting a pyramidal cut to provide a pointed end rather than a wedge shaped end, the blanks are simply passed through the apparatus twice, being loaded into the hopper the second time oriented 90° from the orientation during the first pass.

Those skilled in the art will appreciate that certain alternatives can be incorporated in various parts of the apparatus. For example, the power transfer apparatus illustrated in FIGS. 9 and 10 which is utilized to transfer rotation from the motor 19 to the saw 23, may be eliminated by substituting a light weight motor of sufficient capacity which drives the shaft 62 directly and thus advances and retracts with the saw 23.

Thus, while the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

What is claimed is:

1. Apparatus for sharpening the ends of wooden stake blanks previously cut to a predetermined length comprising:
    (A) a hopper for holding said blanks in vertically stacked orientation, said hopper including means for constraining all except the lowermost one of said blanks against longitudinal movement;
    (B) first hydraulic ram means for advancing the lowermost one of said blanks longitudinally completely out from under the remainder of said blanks in said hopper and into a cutting position;
    (C) second hydraulic ram heads responsive to the positioning by said first hydraulic ram means of said advanced blank into said cutting position for making a first angular cut in said advanced blank proximate the forward end thereof;
    (D) second saw means responsive to the completion of said first angular cut for making a second angular cut in said advanced blank opposite said first cut whereby said first and second cuts effect a sharpened forward end to said advanced blank; and
    (E) sensing means responsive to the completion of said second angular cut for effecting withdrawal of said second hydraulic ram means and instituting advancing of said first hydraulic ram means whereby said sharpened blank is released and ejected forwardly by the next one of said blanks as the next one of said blanks is pushed into said cutting position by said first hydraulic ram means.

2. The apparatus of claim 1, in which said first and second saw means include, respectively, third and fourth hydraulic ram means to effect movement thereof for making, respectively, said first and second cuts.

3. The apparatus of claim 2 in which said first, second, third, and fourth hydraulic ram means include, respectively, first, second, third, and fourth solenoid operated valves, each of said solenoid operated valves having first and second positions for, respectively, admitting pressurized hydraulic fluid from a source to the corresponding one of said ram means to advance said ram means and releasing hydraulic fluid from the corresponding one of said ram means to retract said ram means.

4. The apparatus of claim 3 in which said first, second, third, and fourth solenoid operated valves are each provided with first and second electrical terminals for receiving momentary energization and a third, common terminal, each of said valves assuming said first position when its first terminal is momentarily energized and assuming said second position when said second terminal is energized.

5. The apparatus of claim 4 further comprising:
    (A) first and second switch actuators included with said first saw means;
    (B) third and fourth switch actuators included with said second saw means;
    (C) a fifth switch actuator carried on an extendable portion of said first hydraulic ram means;
    (D) a first normally open switch disposed for actuation by said first actuator when said first saw means has advanced to complete said first cut;
    (E) a second normally open switch disposed for actuation by said second actuator when said first saw means is in a position intermediate between a fully retracted position and a position at which said first switch is actuated, said second switch being of the type in which contact closure results on alternate actuations;
    (F) a third normally open switch disposed for actuation by said third actuator when said second saw means has advanced to complete said second cut;
    (G) a fourth normally open switch disposed for actuation by said fourth actuator when said second saw means is in a position between a fully retracted position and a position at which said third switch is actuated, said fourth switch being of the type in which contact closure results on alternate actuations;
    (H) a fifth normally open switch disposed for actuation by said fifth actuator when said extendable portion of said first hydraulic ram means has advanced to transfer the lowermost one of said blanks from said hopper into said cutting position;
    (I) a source of electrical energy for operating said solenoid operated valves, one side of said source being connected to said third electrical terminals of each of said solenoid operated valves, the other side of said source being connected to one contact of each of said first, second, third, fourth, and fifth normally open switches;
    (J) a second contact of said first switch being coupled to said second terminal of said third solenoid operated valve;
    (K) a second contact of said second switch being coupled to said first terminal of said fourth solenoid operated valve;
    (L) a second contact of said third switch being coupled to said second terminal of said fourth solenoid operated valve;
    (M) a second contact of said fourth switch being coupled to said first terminal of said first solenoid operated valve and also to said second terminal of said second solenoid operated valve; and
    (N) a second contact of said fifth switch being coupled to said first terminal of said third solenoid operated valve and also to said first terminal of said second solenoid operated valve.

References Cited

UNITED STATES PATENTS

| | | | |
|---|---|---|---|
| 493,541 | 3/1893 | Abbott | 143—6 H |
| 3,367,375 | 2/1968 | Watson | 144—30 X |
| 3,491,805 | 1/1970 | Riedener | 143—47 F |

DONALD R. SCHRAN, Primary Examiner

U.S. Cl. X.R.

144—30